(12) United States Patent
Wenom, Jr.

(10) Patent No.: US 7,931,176 B1
(45) Date of Patent: Apr. 26, 2011

(54) EASILY DETACHABLE GOLF BAG CARRIER FOR A MOTORCYCLE

(76) Inventor: Frederick D. Wenom, Jr., Palm Coast, FL (US)

( * ) Notice: Subject to any disclaimer, the term of this patent is extended or adjusted under 35 U.S.C. 154(b) by 621 days.

(21) Appl. No.: 12/051,407

(22) Filed: Mar. 19, 2008

(51) Int. Cl.
*B62J 7/02* (2006.01)
(52) U.S. Cl. .................. 224/413; 224/423; 224/452
(58) Field of Classification Search .......... 224/413, 224/423, 441, 442, 419, 452
See application file for complete search history.

(56) References Cited

U.S. PATENT DOCUMENTS

| | | | |
|---|---|---|---|
| 3,286,891 A | 11/1966 | Jones, Jr. | |
| 3,938,719 A | 2/1976 | Carlton | |
| 4,511,155 A | 4/1985 | Galloway | |
| 4,797,791 A | 1/1989 | Burchick | |
| 5,207,361 A | 5/1993 | Slifka | |
| D439,215 S | 3/2001 | Kahmann | |
| 6,401,998 B1 | 6/2002 | Puluso | |
| 6,484,914 B1 | 11/2002 | Willey | |
| 6,619,522 B2 | 9/2003 | Schurr | |
| 6,698,635 B1 | 3/2004 | Brown | |
| 6,921,099 B2 | 7/2005 | Hoffmann | |
| 6,938,806 B2 | 9/2005 | James | |
| 6,957,821 B2 | 10/2005 | Gorman et al. | |
| 7,150,382 B2 | 12/2006 | Zickefoose | |
| 7,156,272 B2 | 1/2007 | Dean | |
| 2003/0209581 A1 | 11/2003 | Adams | |
| 2005/0258207 A1 | 11/2005 | Sadler | |
| 2007/0012739 A1* | 1/2007 | Geuss | 224/413 |
| 2007/0102467 A1 | 5/2007 | Trulove et al. | |
| 2007/0138223 A1 | 6/2007 | Brown | |
| 2008/0023511 A1* | 1/2008 | King et al. | 224/419 |
| 2008/0169323 A1* | 7/2008 | Deitrich | 224/413 |
| 2009/0014486 A1* | 1/2009 | Humphreys | 224/430 |

OTHER PUBLICATIONS

Wikimedia Foundation, Inc., Sissy Bar, Wikipedia, http://en.wikipedia.org/wiki/Sissy_bar, Sep. 4, 2007.

* cited by examiner

*Primary Examiner* — Justin M Larson
(74) *Attorney, Agent, or Firm* — Grace J. Fishel

(57) ABSTRACT

An easily detachable golf bag carrier for a motorcycle has a platform detachably mountable on a specialized foot peg and a cradle detachably mountable on a fastening rail, all of which are preferably chromed. The foot peg has a tongue and a frame with a slot within which a coupling end of the platform may be pinned. The tongue is adapted to mate with existing foot peg mounting brackets on the motorcycle. The fastening rail has mounting holes adapted to mate with existing fender holes in a motorcycle and the cradle has an arcuate arm for embracing a golf bag which is placed on an accessory end of the platform. The fastening rail and cradle have male and female mating members. The platform and cradle may be easily detached and stored, for example in a saddlebag, and the specialized foot peg and mounting rail left in place without detracting from the motorcycle's functionality or appearance.

10 Claims, 7 Drawing Sheets

EASILY DETACHABLE GOLF BAG CARRIER FOR A MOTORCYCLE

BACKGROUND OF THE INVENTION

1. Field of the Invention

The present invention relates to a golf bag carrier including a platform which is mountable on a specialized passenger's foot peg and a cradle which is mountable on a fastening rail attached to a motorcycle. The platform and cradle are easily detachable without unbolting and storable in a saddlebag or the like. The foot peg and fastening rail may be left in place and do not detract from the use, appearance or enjoyment of the motorcycle.

2. Brief Description of the Prior Art

Motorcycling and golfing are not mutually exclusive sports. For those involved in both and on a beautiful day, it would be nice to be able to go golfing and riding and perhaps not incidentally flaunt the fact that the rider does both. But effectively bringing the best of both worlds together has eluded designers of golf bag carriers.

It is possible to bungee cord a golf bag on a motorcycle but such attachment is time consuming, dangerous for both rider and other vehicles if the bag becomes detached and does not project a prestige image. In addition, the bungee-corded golf bag gets in the way to carrying a passenger. There are commercially available devices which are better than bungee cords. Many of them attach the golf bag to the rear of the motorcycle where it blocks the license plate and signal lights and is not street legal or requires rewiring. There are also devices that attach to the rear and carry a golf bag high above the rear fender but they affect the balance of the motorcycle. There is a commercially available split golf bag that replaces the saddlebags and is zipped back together for use in golfing. But many golfers already have a stylish golf bag which they prefer to use.

What is needed is a stable, side mounted golf bag carrier that mounted in a secure and solid fashion without affecting or offsetting the weight, balance, or alignment of the motorcycle or interfering with the available space for a passenger. In addition, the golf bag carrier should also be easily detachable from mounting means that are left in place on the motorcycle and do not detract from the lines of the motorcycle or its functionality. The present invention provides such a golf bag carrier.

In view of the above, it is an object of the present invention to provide a golf bag carrier for a motorcycle, the carrier including a platform and a cradle that are easily detachable from a specialized passenger's foot peg and a fastening rail. It is another object to provide a golf bag carrier wherein the detached platform and cradle are storable in a motorcycle saddlebag. It is also an object to provide a golf bag carrier wherein the specialized passenger's foot peg and the fastening rail may be left in place and do not detract from the use, appearance or enjoyment of the motorcycle. Other objects and features of the invention will be in part apparent and in part pointed out hereinafter.

In accordance with the invention, a golf bag carrier is provided for attachment to the left-hand side of a motorcycle with a saddlebag optionally left in place on the right-hand side. The golf bag carrier in major part includes a platform detachably mountable on a foot peg and a cradle detachably mountable on a fastening rail.

The foot peg has a tongue attached to a frame. The tongue is adapted to mate with an existing foot peg bracket on a motorcycle and the frame has top, bottom, side and end walls with a slot formed in one of the sidewalls and a hole passing through the top and bottom walls. The frame is attached to the tongue with a bolt passing through the end walls and threaded into the tongue about which the frame may be pivoted with respect to the tongue. The frame is selectively lockable on the bolt with respect to the tongue for positioning the platform with respect to the ground.

The platform has a coupling end slidably receivable in the slot in the frame and an accessory end upon which a golf bag may be placed. There is a hole in the coupling end alignable with the hole passing through the top and bottom walls of the frame when the coupling end is received in the slot in the frame and a hitch pin is inserted through the aligned holes.

The cradle has a laterally extending arcuate arm adapted to partly embrace a golf bag and a depending leg attached to one end of the arcuate arm.

The fastening rail has spaced mounting holes adapted to mate with existing fender holes in a motorcycle and an upwardly extending arm. The arm of the fastening rail and the leg of the cradle have male and female mating members for detachable mounting of the cradle to the fastening rail.

When detached, the platform and cradle may be stored in the right-hand saddlebag, if available and desired, and the specialized passenger's foot peg and fastening rail left in place where they do not detract from the use, appearance (particularly if chromed) or enjoyment of the motorcycle.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 1:
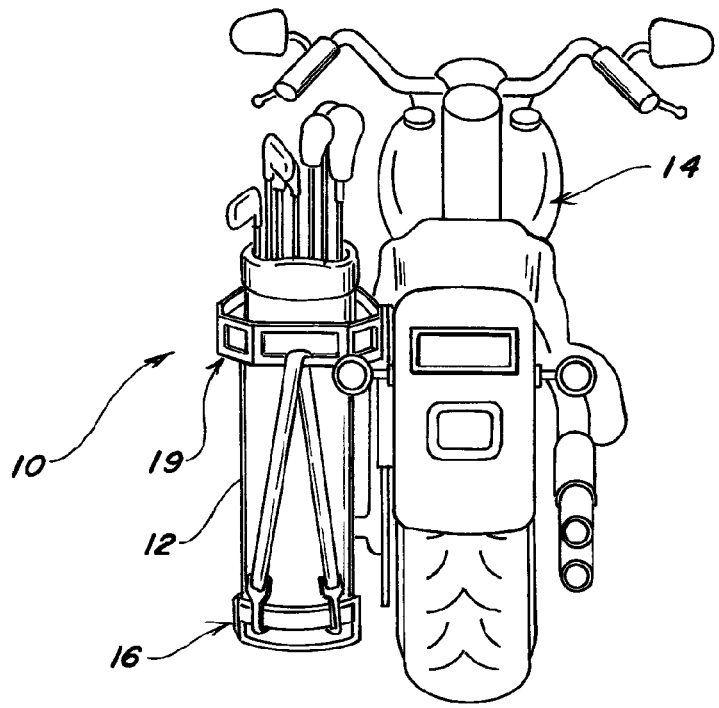
FIG. 1 is a rear view of a motorcycle with a golf bag carrier in accordance with the present invention.

Referring to the drawings more particularly by reference character, reference numeral 10 refers to a golf bag carrier in accordance with the present invention. As shown in FIGS. 1 and 2, a golf bag 12 is mounted on the left hand side of a motorcycle 14 with golf bag carrier 10.

Figure 3:
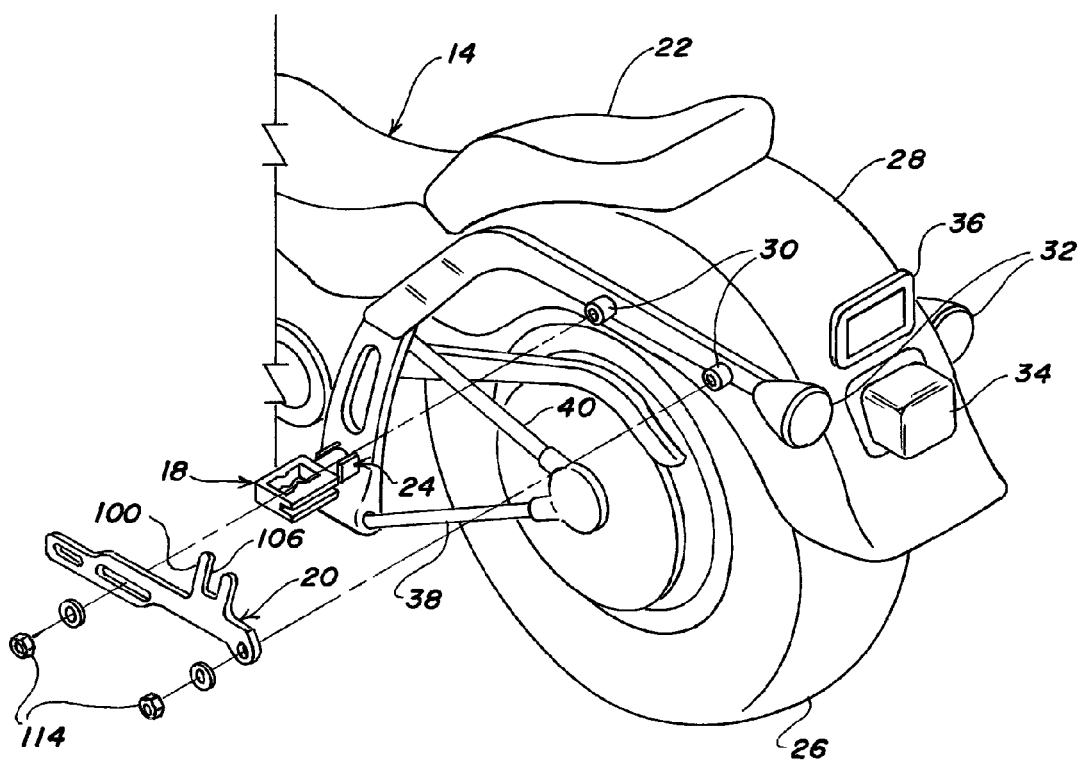
FIG. 3 is a perspective partially exploded view of the rear of a motorcycle showing the attachment of a fastening rail in accordance with the present invention.
Figure 4:
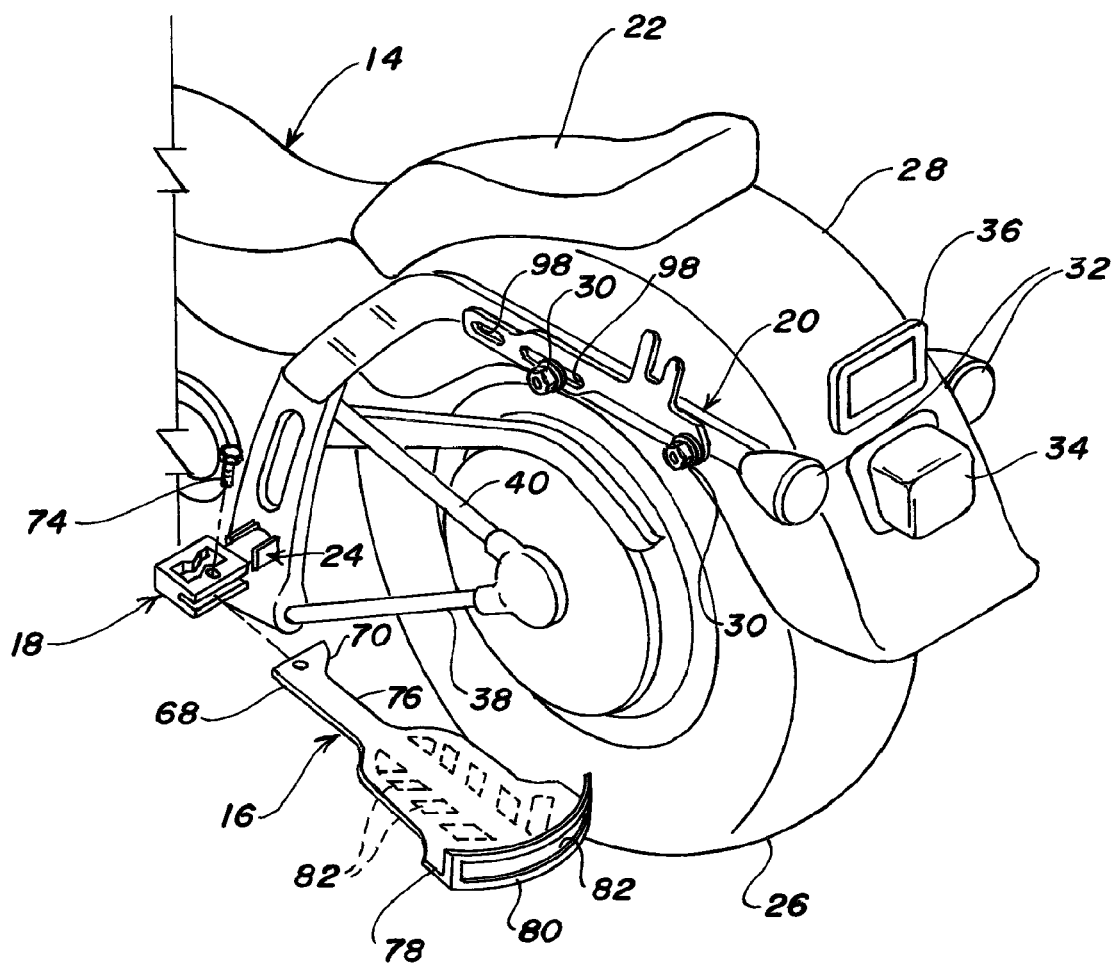
FIG. 4 is a perspective partially exploded view of the rear of a motorcycle showing the attachment of a platform in accordance with the present invention.

In major part, golf bag carrier 10 includes a platform 16 detachably mountable on a specialized passenger's foot peg 18 and a cradle 19 detachably mountable on a fastening rail 20 adapted to mate with existing fender holes as more particularly described below. As shown in FIGS. 3 and 4, a rear portion of motorcycle 10 includes a passenger's seat 22, a foot peg mounting bracket 24, a rear wheel 26, a rear fender 28, bolts 30 in the existing fender holes, right and left signal lights 32, a tail light 34, a license plate frame 36, a suspension link 38 and a suspension strut 40.

Figure 7:
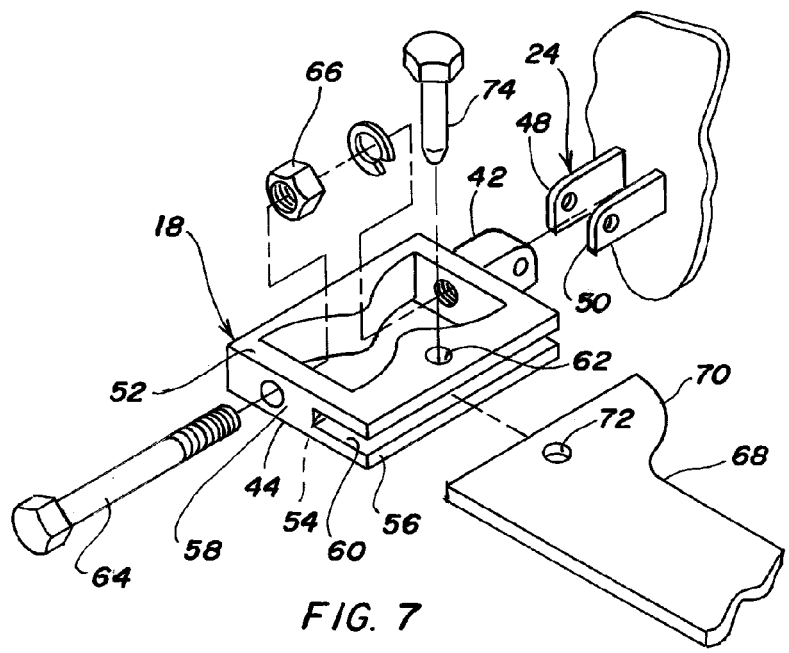
FIG. 7 is a perspective exploded view of a specialized foot peg in accordance with the present invention.

As best seen in FIG. 7, specialized foot peg 18 includes a tongue 42 and a frame 44. In the form illustrated, foot peg mounting bracket 24 is a pair of mounting ears. It will be understood, however, that foot peg mounting bracket may be any well-known type of clamp or foot peg attaching means. As illustrated, tongue 42 has a transverse bore hole by means of which tongue 42 is pivoted on a hinge pin 46 (shown in FIG. 9) between mounting ears of bracket 24. The forward ends of mounting ears of bracket 24 are rounded 48 such that foot peg 18 may be folded upwardly for storage or pushed upwardly on a turn if the motorcycle is banked steeply on a turn but is stopped by frame 44 against a squared off portion 50 of mounting ears of bracket 24 from folding downwardly past horizontal. Frame 44 includes top 52, bottom 54, side 56 and end walls 58. A slot 60 is formed in one of side walls 56 and a hole 62 passes through top and bottom walls 52 and 54. A bolt 64 is passed through end walls 58 for attaching frame 44 to tongue 42 which is tapped for receipt of a threaded end of bolt 64. When bolt 64 is loosened, frame 44 may be rotated about bolt 64 with respect to tongue 42 to adjust the angle that frame 44 makes to the ground for use as described below. When frame 44 is at a desired angle, bolt 64 is tightened in tongue 42 such that frame 44 is locked in position. As security, a locking nut 66 may be provided on bolt 64 as further assurance that frame 44 does not rotate on bolt 64.

Figure 5:
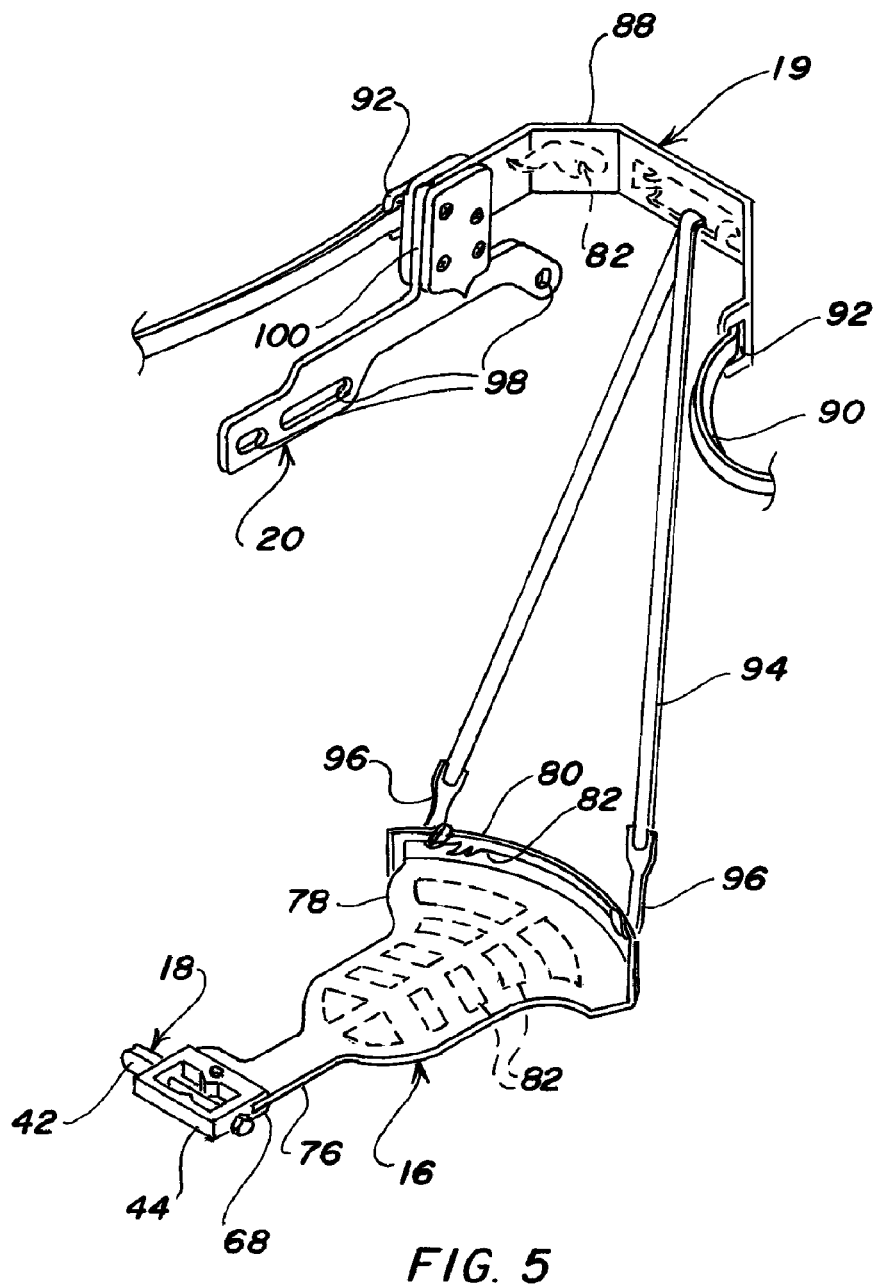
FIG. 5 is a perspective view of the golf bag carrier shown detached from a motorcycle.

Platform 16 includes a coupling end 68 which is slidably receivable through an open end of slot 60. As illustrated in FIGS. 4 and 7, coupling end 68 is in the form of a partially disc shaped head 70 which may be coated with a plastic film to stop vibration and to protect the finish. A hole 72 is provided in coupling end 68 which is alignable with hole 62 in top and bottom walls 52 and 54 and through which a hitch pin 74 is passed for connecting platform 16 to specialized foot peg 18. Hitch pin 74 may be a detent pin with a spring loaded ball to avoid accidental release and may be attached to a lanyard such that it is not separated from platform 16 when platform 16 is unpinned from specialized foot peg 18. Turning to FIGS. 4 and 5, a longitudinal shank 76 connects coupling end 68 to a support end 78 of platform 16. Support end 78 includes a base on which golf bag 12 can ride and a railing structure 80 extending peripherally around a portion of base to provide a degree of confinement. Base of support end 78 has a radial dimension slightly larger than that of the radial dimension of a conventional golf bag. With continuing reference to FIGS. 4 and 5, base of support end 78 may be provided with cutouts 82 which in addition to being decorative, reduce the weight of platform 16. Decorative cutouts 82 may also provided in railing 80 for similar reasons. It will be understood that while base of support end 78 is illustrated as circular along railing 80, base of support end 78 could also be constructed in a rectangular, hexagonal or the like shape to accommodate a variety of different articles for transportation.

Figure 9:
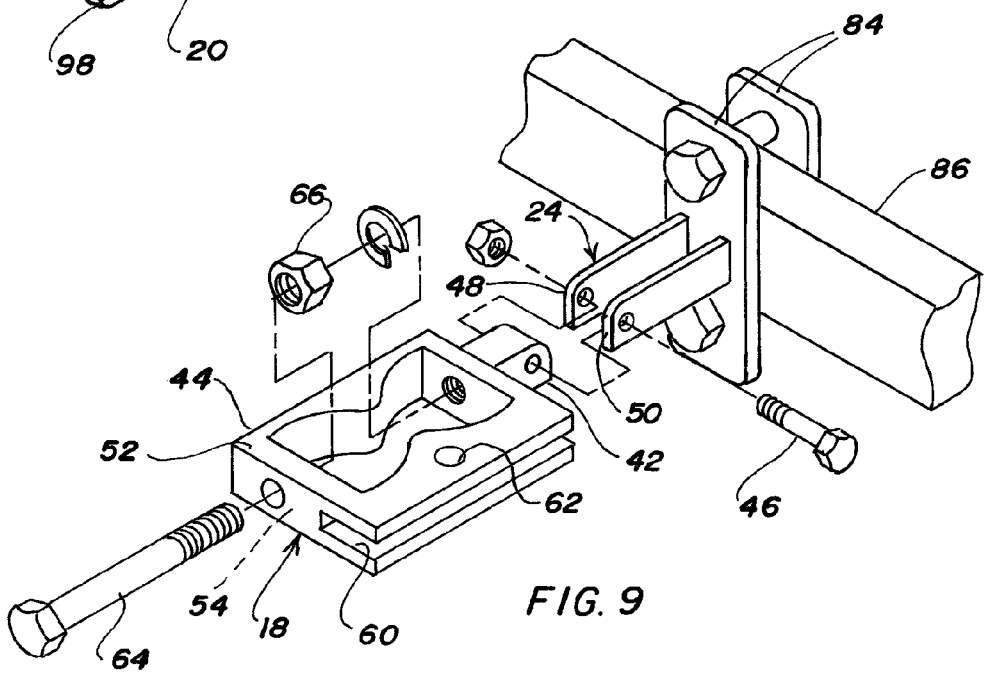
FIG. 9 is a perspective exploded view of the foot peg shown in FIG. 7 being attached to a fastening rail attached to the frame of a motorcycle; and, FIG. 10 is a perspective view of a second fastening rail and a second cradle in accordance with the present invention.

For motorcycles 10 where the existing passenger foot peg is mounted high on the frame, it may be necessary to attach a bracket 84 as shown in FIG. 9 on a portion of a frame 86 that runs along the bike for attachment of specialized foot peg 18.

Figure 8:
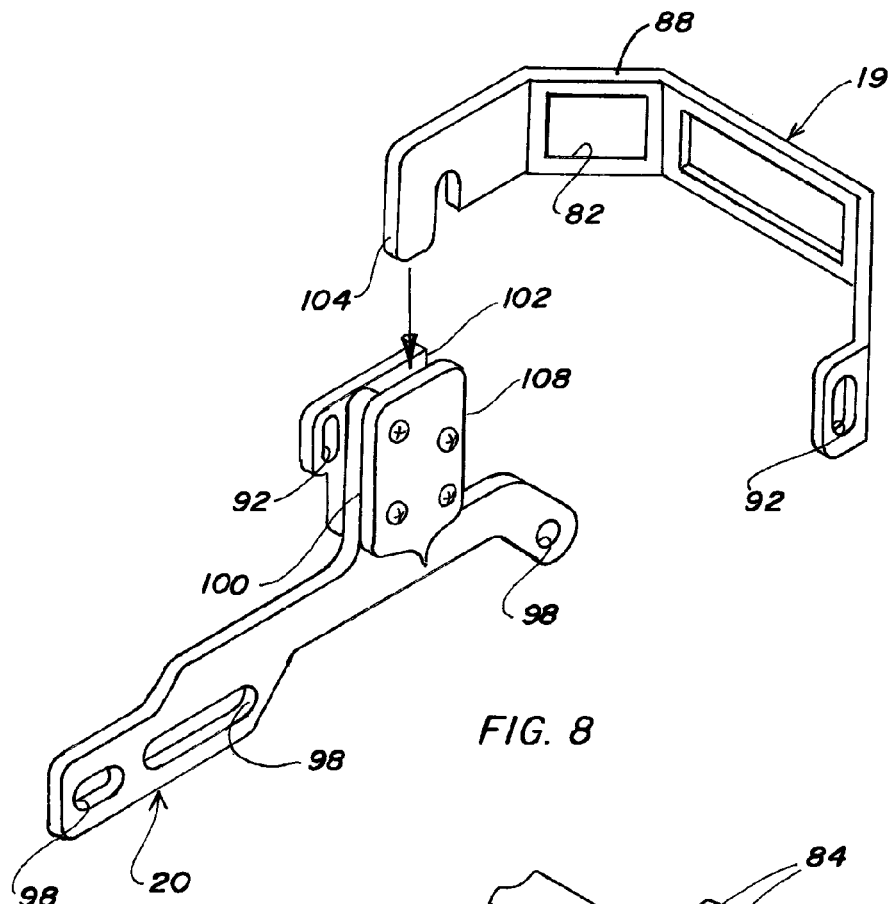
FIG. 8 is a perspective assembled view of the fastening rail shown in FIG. 6 with a cradle in accordance with the present invention.

Cradle 19 as shown in FIGS. 5 and 8 includes a laterally extending arcuate arm 88 which is adapted to loosely embrace golf bag 12. Arcuate arm 88 like base of support end 78 has a radial dimension slightly larger than that of the radial dimension of a conventional golf bag. A securement 90 (FIG. 5) such as a positive locking, quick release buckle is attached to the end of arcuate arm 88 as for example through slots 92 provided in cradle 19 and fastening rail 20 to strap the upper end of a golf bag standing on platform 16 in cradle 19. Cradle 19 like coupling end 68 and railing 80 may be provided with decorative cutouts 82. A strap 94 (FIG. 5) may be provided for interconnecting cradle 19 and platform 16 as secondary means to ensure the support of platform 16 in specialized foot peg 18. In the form illustrated in FIG. 5, strap 94 may be threaded through cutouts 82 in cradle 19 with the ends of strap 94 provided with hooks 96 for attachment to cutouts 82 in railing 80.

Fastening rail 20 as seen in FIGS. 4-5, 6 and 8 is elongated with spaced mounting holes 98, preferably elongated, such that fastening rail 20 may be mounted on various motorcycles 10 wherein the spacing of saddlebag mounting bolts 30 may differ. While fastening rail 20 is illustrated as straight, it will be understood that it may be curved to fit the shape of the fender for some motorcycles 10. Bolts 30 which normally are used to mount saddle bags may be exchanged for longer bolts such that fastening rail 20 may be mounted on fender 28 and left in place with a sufficient length of bolts 30 left to mount the saddlebags without removing fastening rail 20. Fastening rail 20 includes a generally upwardly extending arm 100 including a slot 102 (FIG. 8) into which a downwardly extending leg 104 (FIG. 8) of cradle 19 is received for removable attachment of cradle 19 to fastening rail 20.

Figure 6:
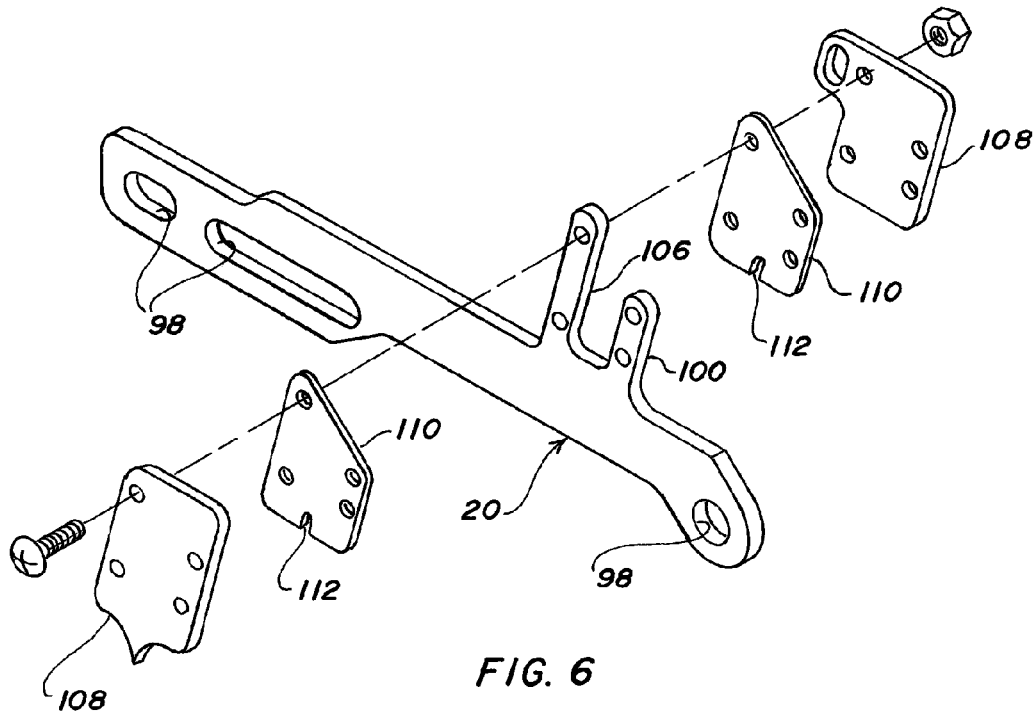
FIG. 6 is a perspective exploded view of a fastening rail in accordance with the present invention.

As best seen in FIGS. 3 and 6, arm 100 terminates with a U-shaped aperture 106 which is sandwiched between plates 108 to form slot 102 in the form of a pocket. The inside of plates 108 may be lined with plastic 110 (FIG. 6), a lower end of which may be notched 112 to drain any water that may accumulate in slot 102. Plastic 110 keeps leg 104 (FIG. 8) from being scratched and the joint from rattling.

Figure 10:
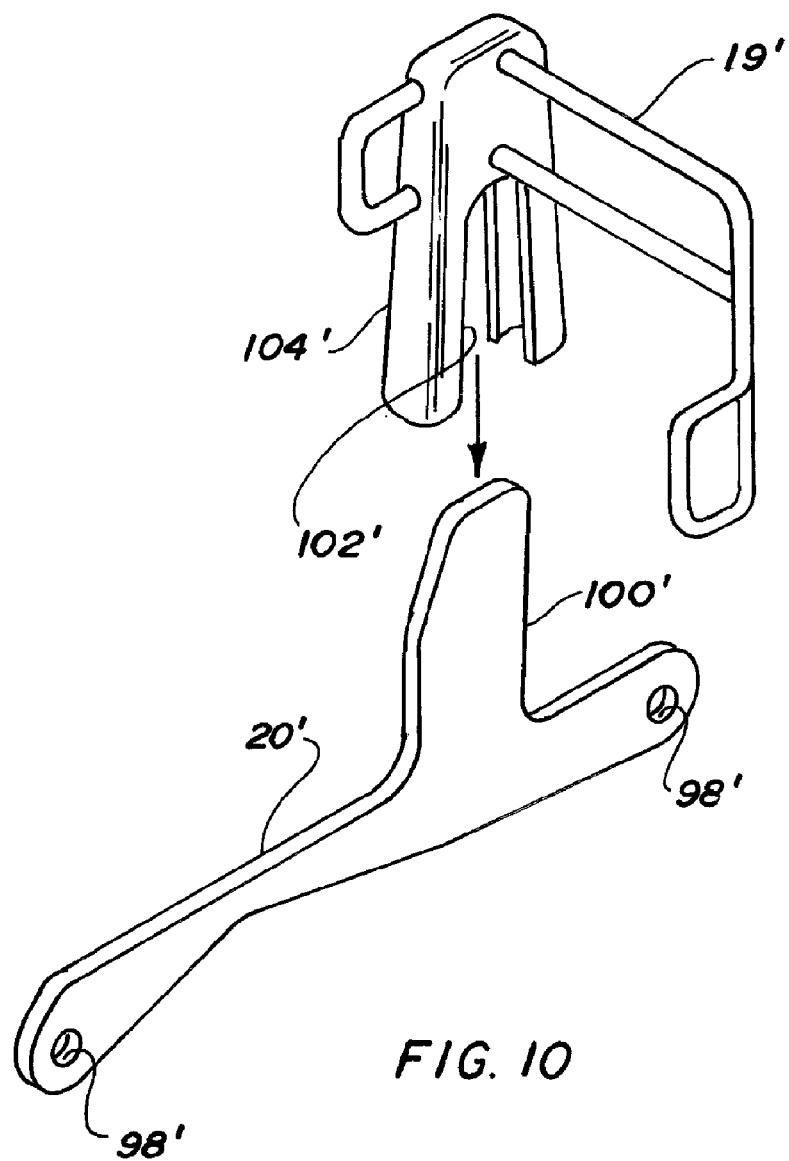

Motorcycle 10 as shown in FIGS. 1-4 is a cruiser and fastening rail 20 is designed for use on cruisers. Other fastening rails such as fastening rail 20' shown in FIG. 10 may be used when motorcycle 10 is a sportster or the like. For use with fastening rail 20', the placement of slot 102' is reversed such that the male and female mating members are reversed. Upwardly extending arm 100' (male member) is received in slot 102' which is provided in the form of a pair of grooves (female member) in depending leg 104' of modified cradle 19'. If motorcycle 10 has a sissy bar and includes a member shaped like arm 100' of fastening rail 20', cradle 19' may be detachably mounted to the sissy bar in the same manner.

Specialized foot peg 18, platform 18, cradle 19 (19') and fastening rail 20 (20') are preferably laser cut from steel and chromed to provide a highly polished, attractive appearance. It will be understood, however, that other metals and in some instances plastics may be used and may even be preferred as resistive to corrosion or the like.

In use, a left saddlebag, if present, is removed from motorcycle 10 and fastening rail 20 installed on bolts 30 and secured in place with nuts 114 as shown in FIG. 3. If desired, longer bolts are substituted for bolts 30 such that the saddle bag may be reattached to motorcycle 10 without removing fastening rail 20.

Figure 2:
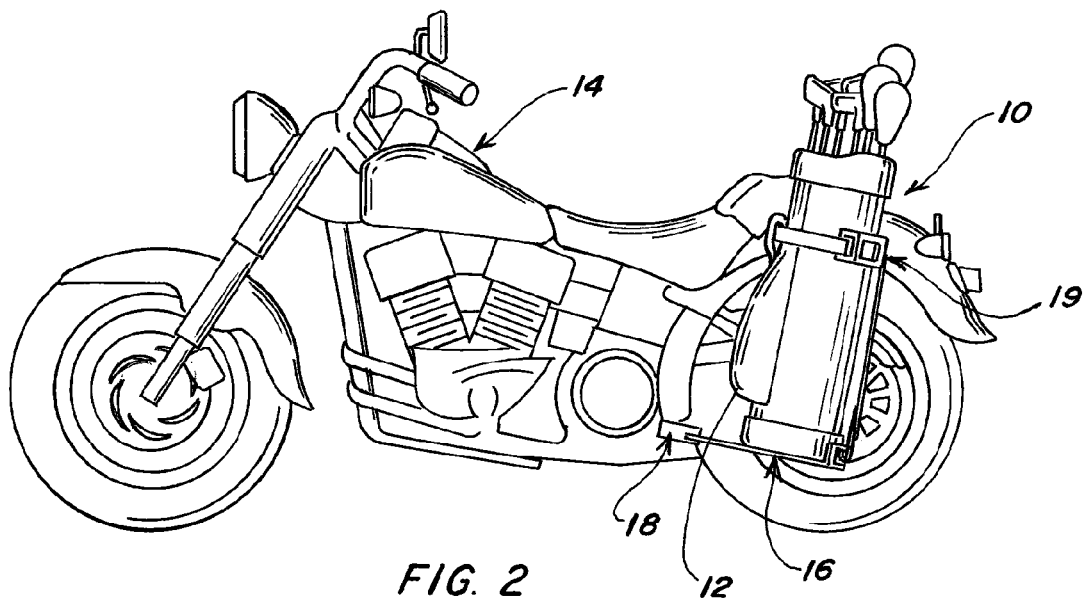
FIG. 2 is a side elevation of the golf bag carrier in use on a motorcycle.

The original passenger foot peg is removed and specialized foot peg 18 installed as shown in FIG. 7. With platform 16 attached to specialized foot peg 18 with hitch pin 74, frame 44 is rotated on bolt 64 such that support end 78 of platform 16 is spaced a desired distance above the ground such that it is unlikely to touch the ground on a turn. Once frame 44 is positioned, bolt 64 and locking nut 66 (if present) are tightened. Strap 94 (if provided) is passed through cutouts 82 in cradle 20 and hooks 96 attached to cutouts 82 in railing 80 a shown in FIG. 5. Golf bag carrier 10 is thus made ready for placement of golf bag 12 on platform 16 and for tightening of securement 90 around the upper end of the bag as shown in FIGS. 1 and 2. During a ride, if platform 16 touches the ground on a turn, specialized foot peg 18 will pivot upwardly carrying platform 16 with it.

Upon reaching a destination (e.g., the golf course), securement 90 may be released and golf bag 12 removed from golf bag carrier 10. Hitch pin 74 may be pulled and platform 16 removed and cradle 20 lifted out of slot 102 in arm 100 of fastening rail 20. Platform 16 and cradle 19 may then be stored in the right saddlebag which may be locked.

With platform 16 and cradle 19 stored in the right saddlebag, motorcycle 10 may be ridden in the usual manner with specialized foot peg 18 serving as a passenger foot peg. If theft is not a worry and the driver has no passenger, platform 16 may remain attached to specialized foot peg 18 and pivoted up such that it is parallel to a longitudinal axis of motorcycle 10 and motorcycle 10 operated in the usual manner.

It is believed that the use of fastening rail 20' and cradle 19' will be apparent from the above-mentioned description of the use of fastening rail 20 and cradle 19. From the above, it is also believed clear that golf bag carrier 10 may be engineered to fit securely on the side of various models of motorcycles and used to haul other elongated cargo such as bag chairs and fishing, hunting or camping gear.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. An easily detachable golf bag carrier for a motorcycle, said carrier comprising:

a platform mounted on a foot peg and a cradle mounted on a fastening rail, said foot peg having a tongue and a frame, said tongue adapted to mate with an existing foot peg bracket on a motorcycle, said frame including top, bottom, side and end walls, a slot formed in one of the sidewalls and a hole passing through the top and bottom walls, a bolt passing through the end walls and threaded into the tongue about which the frame may be pivoted with respect to the tongue, said frame being selectively lockable on said bolt with respect to the tongue;

said platform including a coupling end slidably receivable in the slot in the frame and an accessory end upon which a golf bag may be placed, a hole in the coupling end alignable with the hole passing through the top and bottom walls of the frame when the coupling end is received in the slot in the frame and a hitch pin for insertion through the aligned holes;

said cradle including a laterally extending arcuate arm adapted to partly embrace a golf bag and a depending leg attached to one end of the arcuate arm;

said fastening rail having spaced mounting holes adapted to mate with existing fender holes in a motorcycle and an upwardly extending arm, said arm of the fastening rail and said leg of the cradle having male and female mating members for attachment of the cradle to the fastening rail.

2. The golf bag carrier of claim 1 wherein the existing foot peg bracket comprises a pair of ears between which the tongue of the foot peg is pivoted on a pivot pin passing through the tongue.

3. The golf bag carrier of claim 1 wherein the accessory end includes a railing.

4. The golf bag carrier of claim 3 wherein the accessory end, the railing and the arcuate arm of the cradle include cutouts and wherein a strap with hooks on opposite ends thereof passes through a selected one of the cutouts in the arcuate arm and said hooks are hooked on selected ones of the cutouts in the railing whereby said strap provides a secondary support for the platform.

5. The golf bag carrier of claim 1 wherein the female mating member is the arm of the fastening rail, said arm having a U-shaped aperture and a pair of plates covering the aperture forming a slot for the male mating member which is the leg of the cradle.

6. The golf bag carrier of claim 1 wherein the male mating member is the arm of the fastening rail and said leg of the cradle has a U-shaped aperture with a pair of opposing grooves, said grooves being the female mating member.

7. An easily detachable golf bag carrier for a motorcycle, said carrier comprising:

a platform mounted on a foot peg and a cradle mounted on a fastening rail, said foot peg having a tongue and a frame, said tongue having with a bore hole through which a pivot pin is passed for pivotal attachment of the tongue between a pair of existing foot peg mounting ears on a motorcycle, said frame including top, bottom, side and end walls, a slot formed in one of the sidewalls and a hole passing through the top and bottom walls, a bolt passing through the end walls and threaded into the tongue about which foot peg frame may be pivoted with respect to the tongue, said frame being selectively lockable on said bolt with respect to the tongue;

said platform including a coupling end with a partially disk-shaped head slidably receivable in the slot of the frame, an accessory end and a longitudinal shank connecting the coupling end and the accessory end, a hole in the coupling end which is alignable with the hole through the top and bottom walls of the frame, a hitch pin receivable through the aligned holes for attaching the platform to the frame, said accessory end having a railing;

said cradle including an arcuate arm extending laterally and adapted to partly embrace a golf bag and a depending leg attached to one end of the arcuate arm;

said fastening rail being elongated with spaced mounting holes adapted to mate with existing fender holes in a motorcycle and an upwardly extending arm, said arm of the fastening rail and said leg of the cradle having male and female mating members for attachment of the cradle to the fastening rail.

8. The golf bag carrier of claim 7 wherein the arm of the fastening rail has a slot into which the downwardly extending leg of the cradle is received for attachment of the cradle to the fastening rail.

9. The golf bag carrier of claim 8 wherein the platform, the foot peg, the cradle and the fastening rail are laser cut from steel and chromed.

10. The golf bag carrier of claim 8 wherein the slot in the arm of the fastening rail is lined with plastic and the disk-shaped head of the platform is coated with plastic.

* * * * *